United States Patent Office 3,124,063
Patented Mar. 10, 1964

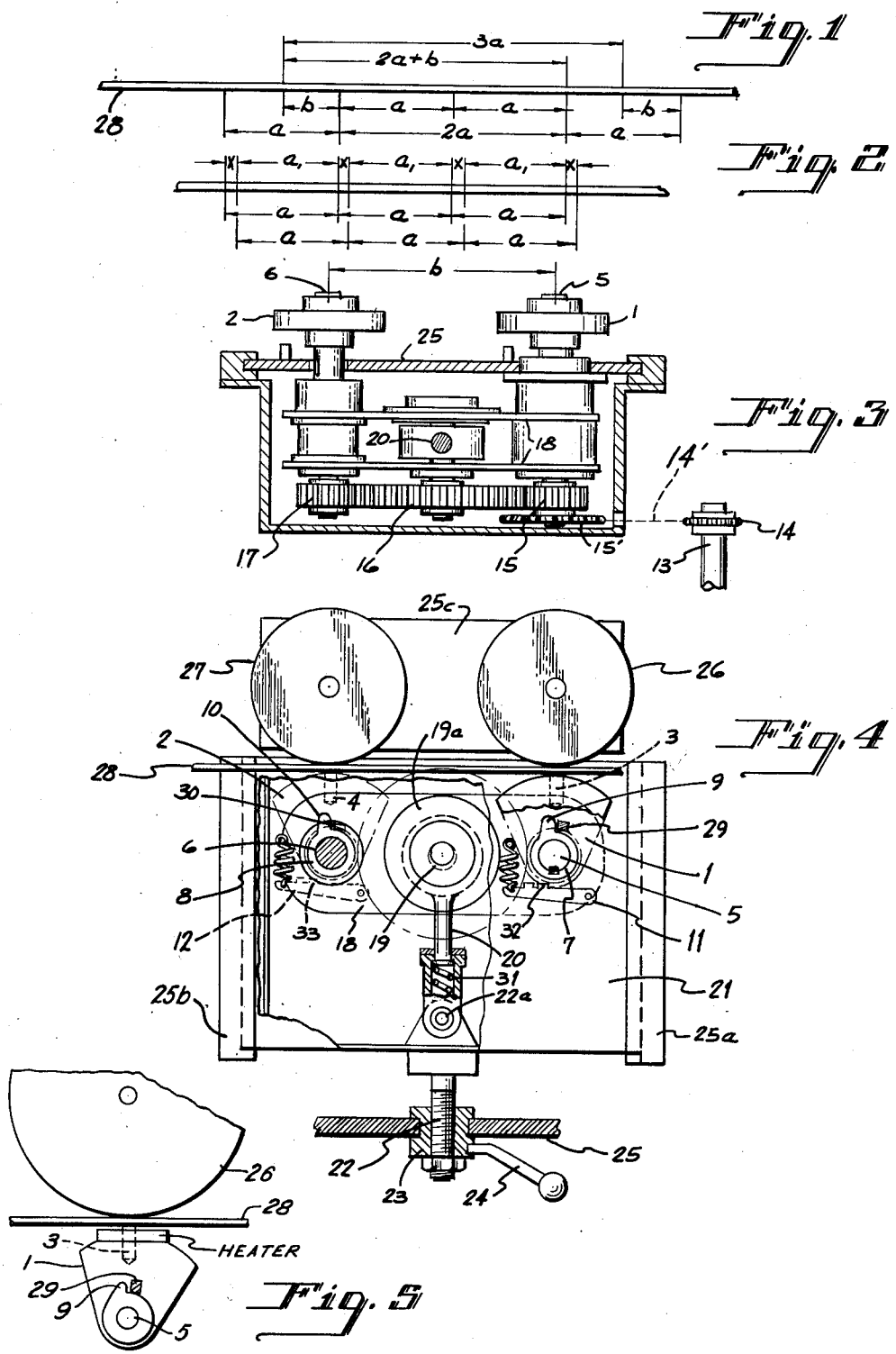

3,124,063
APPARATUS FOR EMBOSSING MARKINGS ON TRAVELLING WORKPIECES
Friedrich Pützler, Aachen, and Josef Kuckertz, Wurselen, Germany, assignors to Schumag Schumacher Metallwerke G.m.b.H., Aachen, Germany, a corporation of Germany
Filed Mar. 28, 1961, Ser. No. 98,874
Claims priority, application Germany Mar. 31, 1960
12 Claims. (Cl. 101—6)

Our invention relates to apparatus for making impressed markings at given intervals on elongated travelling workpieces by means of dies rotating approximately at the same speed as the work travels.

There are known apparatus for continuously printing marks on paper or fabric webs. In these apparatus the printing dies are driven by the work itself, and if the dies themselves or the material of the work is elastic, no particular difficulties are encountered because the effort required for driving the dies is relatively small.

It is an object of the invention to devise such apparatus in such a manner as to also permit metal workpieces to be provided with metal-deforming marks, particularly embossed impressions. Moreover, the apparatus is to be capable also of forming such material-deforming impressions on softer materials such as plastics.

Such devices must cope with various difficulties because the effort required for forming an embossed impression is relatively high and because allowance must be made for the possibility of slippage between the work and the embossing dies.

According to the invention we provide an apparatus for forming impressions at given intervals on elongated travelling workpieces, wherein at least one embossing die is mounted for rotation at approximately the same speed as the work, and wherein drive means are provided for rotating the die independently of the forward motion of the work. The provision of such an independently energized drive for the die permits high pressure to be applied for forming an embossed impression, and also affords producing a clear impression to be produced in the travelling work.

According to another, more specific feature of the invention, we provide the apparatus with a first embossing die rotatable about an axis spaced a fixed distance from the travel path of the work, for forming an impression in the work in the course of each revolution of the die; and we provide the machine with a second embossing die which is spaced from the first die along the work travel path and which revolves at the same speed as first die, for applying another impression independently of the first die, the second die being rotatable about an axis whose spacing from the work can be periodically varied by control means to bring the second die periodically into and out of contact with the work to thereby form an impression in the work at regular intervals between which said second die performs idle revolutions. The second die is preferably also adapted to be completely inactivated.

In such an apparatus, the first embossing die impresses marks into the work at regular intervals. The second die likewise impresses marks into the work at regular, but preferably longer, intervals, thus forming either supplementary or superimposed impressions. Since the two dies are spaced from each other a given distance, the respective impressions formed by the first and the second die are displaced from each other an amount equal to that distance. If the distance between the two dies is exactly equal to the distance between consecutive impressions formed by the first die, then the impressions formed by the second die will be directly superimposed upon the impressions of the first. However, if the two distances are not the same, the first impressions and the supplementary second impressions will be formed at different points along the length of the work. The two embossing dies must revolve at the same speeds because, in principle, their speeds must coincide with the speed of travel of the work, the die rolling on the surface of the travelling work during the formation of the impression. If the second die is required to form impressions at longer intervals than the first die, it is preferable to provide control means for withdrawing the second die from the work during the period a second impression is not required. These control means may be adapted also to entirely inactivate the second die, for instance when only a single type of impression, namely that formed by the first die, is to be applied to the work.

According to a further feature of the invention, a rockable member is mounted on the shaft of the first embossing die and carries at its deflectable end the bearings of the shaft of the second embossing die. The rocking member also carries in an intermediate position the bearings for an eccentric which is embraced by a ring mechanically linked to a fixed point of the machine frame structure. The shaft of the eccentric carries a spur gear meshing with a pinion on the shaft of the first embossing die and also meshing with a pinion on the shaft of the second embossing die, the two pinions having the same number of gear teeth, whereas the gear wheel on the eccentric shaft has either the same number of teeth as the pinions or a multiple thereof. Preferably the pinions and the spur gear are exchangeable for changing the transmission ratio.

The foregoing and other objects and features of our invention, said features being set forth with particularity in the claims annexed hereto, will be apparent from, and will be mentioned in, the following with reference to the embodiment of the invention shown by way of example on the accompanying drawing in which:

FIG. 1 is a schematic representation of a travelling workpiece with normally spaced impressions produced by a first embossing die and more widely spaced supplementary or superimposed impressions produced by a second embossing die.

FIG. 2 is a similar schematic diagram of a workpiece with spaced impressions, illustrating the effect of slippage;

FIG. 3 is a sectional front elevation of apparatus for making impressed markings on elongated travelling workpieces;

FIG. 4 is a plan view of the apparatus illustrated in FIG. 3; and

FIG. 5 is a detail of a modification of FIG. 4, showing a heater for the embossing die.

Referring now to FIGS. 3 and 4, there is shown an apparatus for embossing markings on elongated travelling workpieces delivered from a machine tool (not shown). The apparatus is driven independently of the workpieces although it may derive its driving power from the drive of the machine tool which delivers the work.

The apparatus comprises two embossing segments 1 and 2. The arcuate peripheral portion of each segment has a length corresponding to the distance "a" in FIG. 1. The segments are provided with respective embossing dies 3, 4 located in the middle of the peripheral portion. The segments 1 and 2 are rotatably mounted on shafts 5 and 6, to which entrainers 7 and 8 are keyed. The entrainers have rigid projecting abutments 9 and 10, which, when the shafts 5 and 6 are being rotated, make contact with spring-loaded yielding levers 11, 12 and deflect the latter downward (FIG. 4).

A drive shaft 13 carries a sprocket 14 which drives, through a chain 14' and a second sprocket 15', a pinion 15 fastened on the shaft 5, and thus an intermediate spur gear 16 and a pinion 17 fastened on shaft 6.

A rugged rocking lever 18 is pivotably mounted on the shaft 5, and carries the bearings of the shaft 6. During operation, the lever 18 is periodically raised and lowered by an eccentric 19 which is firmly connected with the intermediate spur gear 16, and which operates a pusher rod 20. A slider 21 is adjustable by a screw spindle 22, a captive nut 23 and a control lever 24, and can be adjusted relative to a fixed member 25 of the machine housing and relative to two backing rollers 26 and 27 which are rotatably mounted on another portion 25c of the housing.

When in operation, the drive means 13, 14, 15, 16 and 17 directly impart rotation to the two segments 1 and 2. At the end of each full revolution of the segment 1 when a workpiece 28 has travelled a distance "a," a mark is impressed into the workpiece by the die 3 of segment 1. The gears 15, 16 and 17 simultaneously rotate the segment 2. However, due to the action of the eccentric 19, the die 4 can form an impression only when the eccentric 19 pushes the die 4 onto the work. For instance, if the transmission ratio between the intermediate gear 16 and the segment is 1:3, the die 4 will not be pressed against the work until the segment 2 has performed three full revolutions. Hence the die 4 can form an impression on the workpiece 28 only at the end of every third revolution of the segment 2. With a distance "b" between the two dies 3, 4 when in impressing positions, a series of consecutive impressions "a" and "b" is formed as shown in FIG. 1. Assume, for instance, that the distance "a"=0.5 m., then the following relationships apply between "b" and "a":

Interval=$2a+b+(a-b)$
Interval=$2a=a$
Interval=$3a$ and, whereas impressions of one set follows at intervals 0.5, 0.5 ... etc., the distance "b" between consecutive impressions of the other set will be 1.5, 1.5 ... etc., because of the transmission ratio 1:3. If the transmission ratio were chosen to be 1:2, then "a" would be 0.5 m. and "b" would be 1.0 m. If the transmission ratio were 1:5, then "a" would be 0.5 m. and "b" would be 2.5 m. In addition to ordinary marks for indicating length, any other impressions, legends, trade names, and so forth can thus be stamped into the work.

In order to ensure that a satisfactory impression will be obtained when slippage occurs, and especially when longer legends are impressed into the work, our invention, according to another feature thereof, makes allowance for the small amount of possible slippage "x" by suitably selecting the speed of rotation of the segments. The desired spacing of the impressions $a=a_1+x$ (FIG. 2) remain, because the magnitude of slippage "x" merely causes a corresponding displacement of the point of impression. The peripheral length of the segment containing the die always remains equal to "a."

In such a case the work will therefore travel at a slightly higher speed than corresponds to the peripheral speed of the segments. When the impression begins to be formed, a fixed abutment 29 slightly gains on abutment 9 because the segment 1 will be entrained by the work, so that the segment 1 and its die 3 will assume the speed of the work.

The same process occurs in the case of segment 2 and its die 4 which produces the supplementary impression.

If desired the production of a supplementary impression or of the basic impression can be suppressed by removing the particular segment.

After the impression has been formed, the fixed abutments 29 and 30 of the segments 1 and 2 respectively continue to the lead the entraining abutments until they reach projections 32 and 33 on levers 11 and 12 where they are intercepted until abutments 9 and 10 have caught up and, by depressing the two levers 11 and 12, release the abutments 29 and 30 and hence the segments for further entrainment by abutments 9 and 10.

By turning the control lever 24, the screw spindle 22, engaging the captive nut 23, moves the slide 21 together with the entire embossing device toward the work, or away therefrom. If desired, the marking device can thus be fully removed from the work and becomes inactive.

To also permit elongated markings to be impressed at uniform pressure by the die 4, the pusher rod 20 (FIG. 4) is telescopically yieldable against spring means 31. Before the die 4 has been fully rotated into contact with the workpiece 28, the spring means urge die 4 forward. In the same way the die continues to be thus loaded after it has been carried beyond the point of closest proximity with the work and the eccentric has passed its dead center position.

The above-described mechanism of the rockable member 18 constitutes a particularly simple and rugged means for withdrawing the second embossing die 4 from the work or applying the die to the work, such forward or reverse displacement being eccentric 19. The ring 19a which embraces the eccentric and which is connected with a normally fixed pivot point at 22a causes the eccentric shaft to move to and fro as the eccentric rotates and this motion of the shaft is imparted to the rockable member 18 and hence to the shaft 6 of the second die, the eccentric and the second die being driven by the aforementioned spur gear 16 and pinion 17. Since the number of gear teeth on the two pinions 15, 17 associated with the dies is the same, the speed of revolution of the two embossing dies 3, 4 is also the same. If the spur gear 16 for driving the eccentric has the same number of teeth as the pinions, the to and fro motion of the rockable member 18 is in synchronism with the rotation of the second die, and this die will therefore form one impression in the course of each revolution. In such a case, the intervals between the impressions of the second die are equal to the intervals between the impressions formed by the first die. However, the two respective sets of impressions are relatively displaced by the distance between axes of the respective shafts 5, 6 of the two dies. On the other hand, if the spur gear 16 driving the eccentric has a number of gear teeth which are a multiple of the pinion teeth, the reciprocating motion of the rockable member is only one-half or one-third or one-quarter, respectively of the rotary movement of the dies. In such a case the second die forms an impression only at the end of every second, third, fourth and so forth revolution. The distance between the impressions formed by the second die will then be two, three, four and more times as long as that between the impressions formed by the first die. Exchangeability of the pinions and spur gear permits the intervals between the impressions of the second die to be thus adjustably varied.

Another feature of the apparatus is constituted by the spring-loaded telescopic member 20, 31 which connects the ring 19a for embracing the eccentric with the normally fixed pivot at 22a. The spring 31 provides a given yieldability to permit the second embossing die to form longer impressions which extend into the region in which the eccentric already or still imparts some motion to the die towards or away from the work. The spring means permits continuous rotation of the eccentric without either generating excessive pressure of the die on the work or unduly curtailing the period of contact between the die and the work. Moreover, a telescopic connection has the incidental advantage of providing a simple form of connection between the ring embracing the eccentric and the fixed pivot points to which it is anchored. The pivot at 22a is needed because the motions of the eccentric also contain components in a direction normal to the connecting line between the eccentric axis and the fixed point of anchorage.

As has been above explained, the rotary motion of the first embossing die 3 is transmitted by gear wheels 15, 16, 17 to the eccentric shaft and to the shaft of the second embossing die. It is especially advantageous to apply driving power to the shaft of the first die because this shaft is mounted in a stationary part of the casing, whereas the shaft of the eccentric and the shaft of the second die are both rockably mounted. The intermediate transmission 14, 14', 15 affords using a suitable transmission ratio for adapting the speed of embossing dies to the speed of the travelling work.

The above-described backing rollers 26, 27, may enter the run idle or may also be driven. These backing rollers provide the reactive pressure when the dies press into the work.

It is of particular advantage to provide the apparatus with the adjustably displaceable slider 21 which carries the bearings of the first embossing die and the fixed pivot 22a of the telescopic connecting member and which is adjustable in relation to the backing rollers in conformity with the thickness of the work, the slider 21 being guided in slide ways 25a, 25b of the machine housing or frame structure.

Since the rockable member 18 which carries the shafts of the eccentric and of the second embossing die is pivotably mounted on the shaft of the first embossing die, the location of the pivot 22a of the telescopic member on the slider 21 has the result that the entire assembly of the impression forming devices, comprising the dies and the control means for the second embossing die, is mounted on the adjustable slider. Since the backing rollers 26, 27 are mounted on a stationary part of the machine, any displacement of the slider 21 changes the gap between the plane of action of the embossing dies and the backing rollers. This gap can thus be adjusted to conform with the thickness of the work before the embossing apparatus begins to work. Such adjustment of the slider in relation to the backing rollers can readily be effected during operation by means of the handle 24.

Another advantage of the apparatus is the fact that the embossing dies are rotatably mounted on their shafts, and that entraining elements 9, 10 are provided on said shafts for transmitting the shaft rotation to the embossing die but permitting each die to rotate faster than its shaft. Therefore the shafts can be driven to impart to the dies a peripheral speed less than the nominal speed of the work by the amount of any possible slippage. This secures accurate embossing operation regardless of such slippage. If the embossing dies were driven at an invariably constant speed, any slippage would make the resultant impressions imprecise and unclear. However, the apparatus described allows the embossing dies to be positively entrained by the work during the actual formation of the impressions. When this is the case the entrainable member on the embossing die may temporarily lose contact with, and gain on the entraining member 9, 10 on the shaft. The effort required for such accelerated entrainment is small because the difference between the speeds is not very great. Conveniently the difference between the speed of the shafts of the dies and the speed of the work may be chosen to be slightly greater than the maximum possible slippage expectable. Under such conditions the embossing dies are normally driven at a speed slightly below that of the work. As soon as the dies make contact with the surface of the work they are slightly accelerated to the actual speed of the work. Only then will the cooperating entraining members on the dies and the associated shafts lose contact and permit the dies to slightly gain on the shafts. As soon as thereafter the embossing dies lose contact with the work the amount of angular gain of the dies is compensated during their further rotation. The same procedure takes place when the dies are again in contact with the work, the resultant angular gain of the dies being likewise compensated thereafter, and so forth. If the slippage of the work is exactly equal to the difference between the nominal speed of the work and the speed of rotation of the dies when entrained by their shafts, then the dies will not be angularly accelerated in relation to their shafts and no gain need be compensated. On the other hand, if the amount of slippage is less than in the afore-described case, then the work will travel somewhat faster and cause the dies to gain on their shafts during the period of contact with the work, and this angular advance must then be compensated. It is important in every case that the peripheral speed of the dies should exactly correspond to the speed of travel of the work while the impression is being formed and that during the remaining time the dies be rotated without any effort being required on the part of the work, so that during the formation of the impression the effort needed for entraining the die at the desired speed is extremely small.

As described, the illustrated apparatus also comprises arresting means for returning the embossing die into contact with its entraining member 9 or 10 after the die has lost contact with the work, and an abutment or control member on the arresting means for releasing the same when the entraining member on the die shaft makes contact with the abutment. These components function as follows. When the embossing die loses contact with the work its angular position may be slightly in advance of the angular position of the shaft. In the course of further rotation of the shaft the friction between shaft and die will continue to entrain the die until the entrainable member 29, 30 on the die strikes the arresting means 11, 12. The die is now retained while its shaft continues to rotate. Immediately afterwards the entraining member on the shaft will strike the abutment 32, 33 on the arrest-means 11, 12 and deflect the same for releasing the die. At the same time the entraining member on the shaft has again made contact with the entrainable member on the die, so that the latter is now entrained in the required angular position at the speed of the shaft which is slightly less than the travel speed of the work. It is preferable to design the arresting means as detents of which the one (11) associated with the first embossing die is deflectably mounted on the adjustable slider 21, whereas the arresting detent 12 associated with the second embossing die is deflectably mounted either on the slider 24 or on the rockable member 18. This particular embodiment of the arresting means is of especially simple construction but nevertheless most reliable in operation. If desired, as shown in FIG. 5, means may be provided for heating the embossing dies, so that the apparatus may be used for forming impressions in work made of synthetic plastic material.

We claim:

1. Apparatus for forming impressions at given intervals on elongated travelling workpieces, comprising guide means defining a travel path for the work, a first embossing die, a first shaft spaced a fixed distance from said path, said first die being rotatably mounted on said first shaft for forming an impression in the work during each revolution of the die, a second embossing die spaced from said first die along said path and mounted to rotate at the same speed as said first die for applying to the work another impression independently of the first die, a second shaft on which said second die is rotatable, control means connected with said second shaft for periodically varying the spacing of said second shaft from said path to bring said second die into contact with the work to thereby form an impression on the work at regular intervals separated by idle revolutions of said second die, and drive means connected with at least one of said dies and being independent of the work travel, a rocking member pivotally mounted on said first shaft, said second shaft being journalled on said rocking member in spaced relation to said first shaft, said control means comprising an eccentric journalled on said rocking member midway between said two shafts, a ring surrounding said eccentric and pivotally connected with a fixed point, a first pinion fastened on said first shaft, a spur gear coaxially joined with said eccentric and meshing with said first pinion, a second pinion fastened on said second shaft and meshing with said gear, said two pinions having like numbers of teeth, and said drive means being drivingly connected with said first shaft.

2. In apparatus according to claim 1, said pinions and spur gear being exchangeable for changing the pinion-to-gear transmission ratio.

3. Apparatus for forming impressions at given intervals on elongated travelling workpieces, comprising guide means defining a travel path for the work, a first embossing die, a first shaft spaced a fixed distance from said path, said first die being rotatably mounted on said first shaft for forming an impression in the work during each revolution of the die, a second embossing die spaced from said first die along said path and mounted to rotate at the same speed as said first die for applying to the work another impression independently of the first die, a second shaft on which said second die is rotatable, a rocking member pivotally mounted on said first shaft, said second shaft being journalled on said rocking member in spaced relation to said first shaft, an eccentric journalled on said rocking member midway between said two shafts, a ring surrounding said eccentric, a spring-loaded telescopic member having one end connected with said ring and having a fixed pivot axis at the other end, a first pinion fastened on said first shaft, a spur gear coaxially joined with said eccentric and meshing with said first pinion, a second pinion fastened on said second shaft and meshing with said gear, said two pinions having like numbers of teeth, and drive means connected with said first shaft.

4. Apparatus according to claim 3, further comprising two backing rollers opposite said respective embossing dies for backing the work during embossing, said backing rollers having fixed axes of rotation.

5. Apparatus according to claim 4, further comprising an adjustably displaceable slider having bearings for said first shaft and having a fixed pivot for said telescopic member, said slider being adjustable in relation to said backing rollers in conformity with the thickness of the work.

6. Apparatus according to claim 5, further comprising a screw spindle connected with said slider for adjusting the latter, a rotatable captive nut in threaded engagement with said spindle, and a hand lever affixed to said nut for rotating the same and thereby longitudinally displacing said spindle and slider.

7. Apparatus for forming impressions at given intervals on elongated travelling workpieces, comprising guide means defining a travel path for the work, a first embossing die, a first shaft spaced a fixed distance from said path, said first die being rotatably mounted on said first shaft for forming an impression in the work during each revolution of the die, a second embossing die spaced from said first die along said path and mounted to rotate at the same speed as said first die for applying to the work another impression independently of the first die, a second shaft on which said second die is rotatable, control means connected with said second shaft for periodically varying the spacing of said second shaft from said path to bring said second die into contact with the work to thereby form an impression on the work at regular intervals separated by idle revolutions of said second die, and drive means connected with at least one of said dies and being independent of the work travel, said embossing dies being rotatably mounted on said respective shafts, entraining members mounted on said respective shafts for transmitting the rotation of the shafts to the respective embossing dies while permitting each die to rotatably gain on the shaft, said drive means having a speed rating at which said dies are driven at a peripheral speed less than the nominal speed of the work by a given amount corresponding to expectable slippage.

8. Apparatus according to claim 7, further comprising arresting means for returning the embossing die into contact with its entraining member after the die has lost contact with the work, and an abutment on the arresting means for releasing the same when the entraining member on the shaft of the embossing die makes contact with said abutment after having caught up with the embossing die.

9. Apparatus according to claim 8, further comprising a first arresting detent disposed at said first embossing die and deflectably mounted on said adjustable slider, a second deflectable arresting detent disposed at said second embossing die, respective entrainable members on said embossing dies engageable with respective entraining members on said shafts, a projecting abutment on each of said arresting detents for cooperation with said respective entrainable members on said embossing dies, and spring means for biasing said arresting detents to their normal positions.

10. In apparatus according to claim 9, said second detent being deflectably mounted on said rocking member.

11. Apparatus for forming impressions at given intervals on elongated travelling workpieces, comprising guide means defining a travel path for the work, first and second shafts spaced from said travel path, rotatable embossing dies peripherally engageable with the work along said path and mounted on said shafts for rotation at approximately the travel speed of the workpiece, entrainer members on said shafts and entrainable members on said embossing dies respectively engageable for transmitting the shaft rotation to the respective embossing dies while permitting each die to rotatably advance ahead of its shaft rotation, drive means connected with at least one of said shafts for imparting thereto a peripheral speed which is less than said travel speed of said workpiece by a given amount corresponding to expected workpiece slippage, arresting means engageable with the entrainable member of a respective embossing die for arresting the latter after said respective dies has lost contact with the workpiece, and a control member on said arresting means for releasing said arresting member when said entrainer member makes contact with said control member after said entraining member has caught up with the entrainable member on a respective embossing die.

12. Apparatus according to claim 11, comprising heating means for heating the embossing dies.

References Cited in the file of this patent
UNITED STATES PATENTS

| | | |
|---|---|---|
| 1,480,025 | Speer | Jan. 8, 1924 |
| 1,668,616 | Tracy | May 8, 1928 |
| 2,184,552 | Hinsky | Dec. 26, 1939 |
| 2,523,757 | Goldstein | Sept. 26, 1950 |
| 2,603,153 | Warren et al. | July 15, 1952 |